United States Patent
Didari et al.

(10) Patent No.: US 12,494,046 B2
(45) Date of Patent: Dec. 9, 2025

(54) BAYESIAN SEMANTIC SEGMENTATION ACTIVE LEARNING WITH BETA APPROXIMATION

(71) Applicant: SAMSUNG SDS AMERICA, INC., San Jose, CA (US)

(72) Inventors: Sima Didari, San Jose, CA (US); Jae Oh Woo, Fremont, CA (US); Heng Hao, San Jose, CA (US); Hankyu Moon, San Ramon, CA (US); Patrick Bangert, Sunnyvale, CA (US)

(73) Assignee: SAMSUNG SDS AMERICA, INC., San Jose, CA (US)

( * ) Notice: Subject to any disclaimer, the term of this patent is extended or adjusted under 35 U.S.C. 154(b) by 369 days.

(21) Appl. No.: 18/114,820

(22) Filed: Feb. 27, 2023

(65) Prior Publication Data
US 2023/0368507 A1     Nov. 16, 2023

Related U.S. Application Data

(60) Provisional application No. 63/341,788, filed on May 13, 2022.

(51) Int. Cl.
| | | |
|---|---|---|
| *G06V 10/774* | (2022.01) | |
| *G06N 3/047* | (2023.01) | |
| *G06V 10/26* | (2022.01) | |
| *G06V 10/764* | (2022.01) | |
| *G06V 10/778* | (2022.01) | |
| *G06V 10/82* | (2022.01) | |
| *G06V 20/70* | (2022.01) | |

(52) U.S. Cl.
CPC ......... *G06V 10/7753* (2022.01); *G06N 3/047* (2023.01); *G06V 10/26* (2022.01); *G06V 10/764* (2022.01); *G06V 10/778* (2022.01); *G06V 10/82* (2022.01); *G06V 20/70* (2022.01)

(58) Field of Classification Search
CPC .. G06V 10/7753; G06V 10/26; G06V 10/764; G06V 10/778; G06V 10/82; G06V 20/70; G06V 10/774; G06N 3/047; G06N 3/045; G06N 3/09
See application file for complete search history.

(56) References Cited

U.S. PATENT DOCUMENTS

2020/0326667 A1* 10/2020 Ahuja ................. G06N 3/047

OTHER PUBLICATIONS

Bayesian SegNet, Kendall et al 2016 (Year: 2016).*

* cited by examiner

*Primary Examiner* — Jianxun Yang
(74) *Attorney, Agent, or Firm* — Sughrue Mion, PLLC

(57) ABSTRACT

Training of a machine vision model, a segmentation model, is performed by using an acquisition function for a small number of pixels of one or more training images. The acquisition function uses first mutual information and second mutual information to identify unlabelled pixels which are labelled with high uncertainty when predicting possible label values. Training, prediction of labels, identifying pixels with highly uncertain labels, obtaining labels only for those pixels with highly uncertain labels and retraining are performed iteratively to finally provide the machine vision model. The iterative approach uses very few labelled pixels to obtain the final machine vision model. The machine vision model accurately labels areas of a data image.

20 Claims, 8 Drawing Sheets

BAYESIAN SEMANTIC SEGMENTATION ACTIVE LEARNING WITH BETA APPROXIMATION

CROSS REFERENCE TO RELATED APPLICATION(S)

This application claims benefit of priority to U.S. Provisional Application No. 63/341,788 filed May 13, 2022, the content of which is incorporated by reference herein.

FIELD

The present disclosure is related to recognizing image content in machine vision applications.

BACKGROUND

Some semantic segmentation models are trained in a fully supervised setting depending on the availability of per pixel annotation. This by default makes the data preparation process costly and challenging to scale. As an example, approximately 1.5 hours are required to annotate each image in the Cityscapes segmentation dataset.

SUMMARY

To reduce the burden of annotation Active learning (AL) models were suggested as an alternative training framework reducing the annotation cost by selecting only the most informative samples for labeling.

One of the main challenges in AL is finding a representative subset of data with very little redundancy for labeling pixels. In semantic segmentation, this subset can either be a collection of regions within images or a collection of pixels within images. In any given image an abundance of pixels are strongly correlated and carry the same information. Therefore, selecting the most informative subset of pixels with low redundancy can reduce the annotation cost. Embodiments provide a highly data efficient AL model utilizing sparse pixel annotation that reaches to close to supervised model accuracy using only few pixels (~20) per image. Embodiments include an uncertainty measure called Beta Approximation for Bayesian Active Learning (BAP) and implement that as a pixel-based sampling strategy for the semantic segmentation AL task.

Success of uncertainty-based subset selection strategies in AL models heavily depends on accurately capturing deep learning models' uncertainty. Since deep learning models cannot provide a reliable measure for the uncertainty of their predictive outputs, Bayesian deep learning models have been developed as practical frameworks for deep learning models' uncertainty measurement. Uncertainty in a Bayesian deep learning model has been categorized mainly into two types: aleatoric and epistemic uncertainties. Aleatoric uncertainty captures the noise inherent in the data and might not be reduced even by collecting more data. Epistemic uncertainty can be explained as uncertainty in model's parameters or as model's ignorance given enough data, and is often referred to as model uncertainty. By approximating aleatoric uncertainty together with epistemic uncertainty as a regularization term in the loss function it was empirically shown that these uncertainties are not mutually exclusive and training the model using the combined regularization term improves its performance.

An active learning process is an iterative task. At each cycle, newly labeled data are added and the model is retrained. Therefore both epistemic and aleatoric uncertainties representing model and data uncertainties are subjected to change throughout the cyclic training process. As AL training progresses, its epistemic uncertainty is expected to decrease since the model accuracy increases given the larger labeled data. However, at the same time the AL model needs to explore unlabeled data to find the most informative samples. This exploration step also affects models' aleatoric uncertainty. Embodiments capture various uncertainties throughout the process and provide an optimal sampling strategy that takes into the account their mutual effect.

Comparative uncertainty-based AL frameworks train the model by constraining either of these uncertainties and as a result they fail to reach superior performance without deployment of specially tailored model architecture, loss function or introduction of some level of randomness to their sampling strategies.

Embodiments include a Bayesian AL framework named PixelBABA that utilizes a pixel-wise acquisition function based on BAP uncertainty measure capturing various sources of uncertainty. PixelBABA includes diversification and exploration characteristics leading to good accuracy even for under-representative categories using only a fraction of labels.

Embodiments introduce a simple and yet efficient pixel-based approach for AL in semantic segmentation with realistic click-based annotation cost taken into consideration, and demonstrate its effectiveness over the current state-of-the-art.

Embodiments such as the algorithm of Table 1 have performance close to supervised level performance, see Tables 2 and 3, given a tiny fraction of labeled data across various backbones and datasets without the need of generating superpixels, tailored loss function or tuning any hyper-parameter for the acquisition function.

Embodiments select diverse samples in the datasets. Performance is comparable with supervised training across datasets as wells as the under-represented object categories. See Tables 2 and 3.

Embodiments include a new measure for uncertainty estimation in semantic segmentation active learning scenarios and study the interplay between epistemic and aleatoric uncertainties in AL training process.

Provided herein is a method of training a machine vision model for recognition of scene content, the method including: obtaining a first plurality of labels for a first subset of pixels in a training image, wherein the first plurality of labels are drawn from a set of class labels; training a segmentation model based on the first plurality of labels, wherein the segmentation model is the machine vision model; predicting a plurality of probability distributions for respective remaining pixels in the training image, wherein the remaining pixels do not have labels; identifying, with an acquisition function, a second subset of remaining pixels with a greatest level of uncertainty, wherein the acquisition function uses a first mutual information of MJEnt and a second mutual information measure of BALD; obtaining a second plurality of labels, from the set of class labels, for the second subset; training the segmentation model based on the second subset using the second plurality of labels; receiving a data image for analysis; and performing machine vision on the data image using the segmentation model to identify a third plurality of labels, from the set of class labels, corresponding to respective regions in the data image.

Also provided is an apparatus including: one or more processors; and one or more memories storing instructions, wherein an execution by the one or more processors of the instructions is configured to cause the apparatus to: obtain a first plurality of labels for a first subset of pixels in a training image, wherein the first plurality of labels are drawn from a set of class labels; train a segmentation model based on the first plurality of labels, wherein the segmentation model is the machine vision model; predict a plurality of probability distributions for respective remaining pixels in the training image, wherein the remaining pixels do not have labels; identify, with an acquisition function, a second subset of remaining pixels with a greatest level of uncertainty, wherein the acquisition function uses a first mutual information of MJEnt and a second mutual information measure of BALD; obtain a second plurality of labels, from the set of class labels, for the second subset; train the segmentation model based on the second subset using the second plurality of labels; receive a data image for analysis; and perform machine vision on the data image using the segmentation model to identify a third plurality of labels, from the set of class labels, corresponding to respective regions in the data image.

Also provided is a non-transitory computer readable medium storing instructions to be executed by one or more processors to: obtain a first plurality of labels for a first subset of pixels in a training image, wherein the first plurality of labels are drawn from a set of class labels; train a segmentation model based on the first plurality of labels, wherein the segmentation model is the machine vision model; predict a plurality of probability distributions for respective remaining pixels in the training image, wherein the remaining pixels do not have labels; identify, with an acquisition function, a second subset of remaining pixels with a greatest level of uncertainty, wherein the acquisition function uses a first mutual information of MJEnt and a second mutual information measure of BALD; obtain a second plurality of labels, from the set of class labels, for the second subset; train the segmentation model based on the second subset using the second plurality of labels; receive a data image for analysis; and perform machine vision on the data image using the segmentation model to identify a third plurality of labels, from the set of class labels, corresponding to respective regions in the data image.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Figure 1:
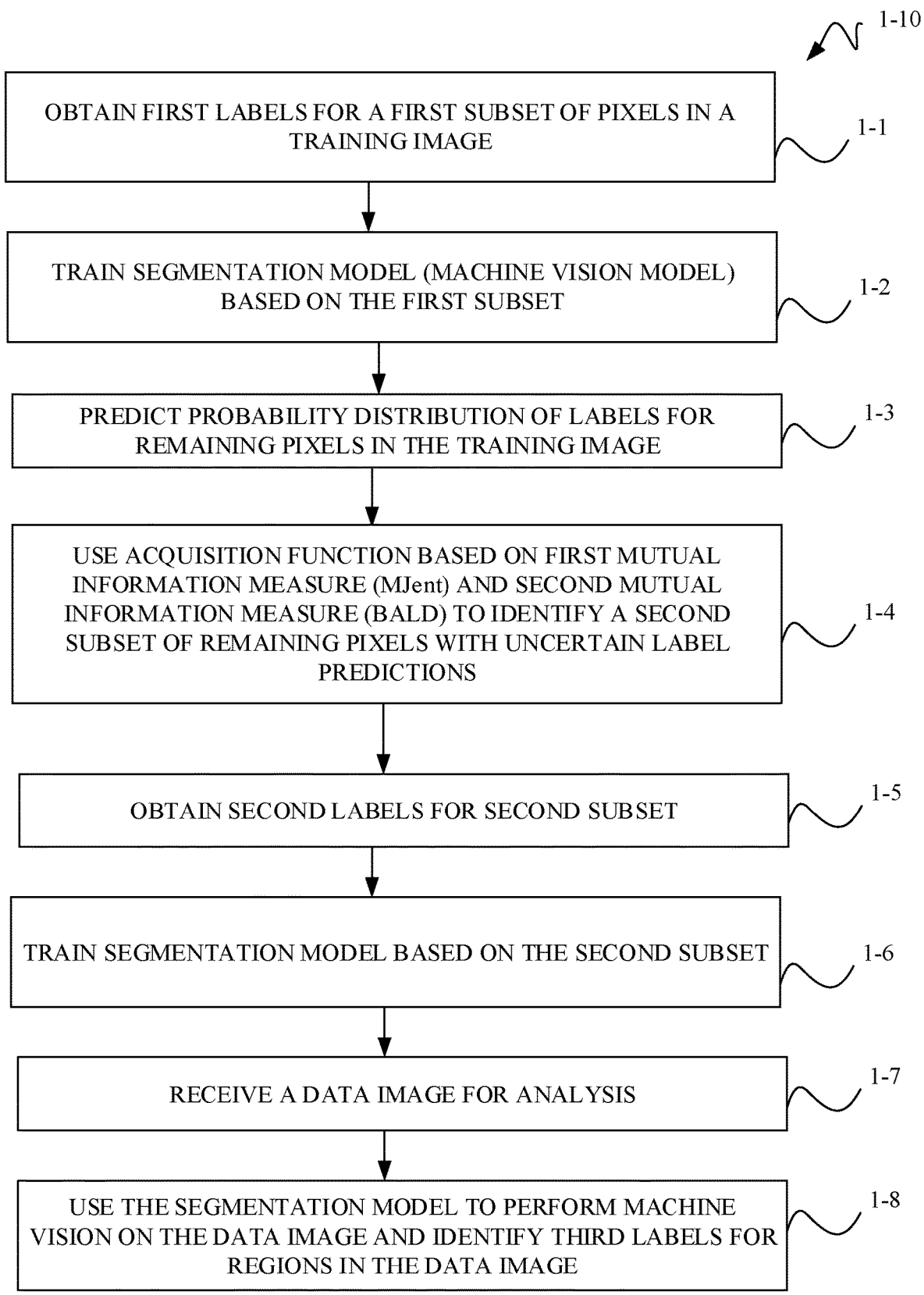
FIG. 1 illustrates logic for training and applying a Bayesian semantic segmentation model using active learning, according to some embodiments.

Training of a machine vision model, a segmentation model, is performed by using an acquisition function for a small number of pixels of one or more training images. For a logic flow, see FIG. 1, for a block diagram, see FIG. 2. Labels are predicted for unlabelled pixels and the probability distributions of the resulting random variables are found, see FIGS. 3 and 4. The acquisition function uses first mutual information and second mutual information to identify unlabelled pixels which are labelled with high uncertainty when predicting possible label values. See FIG. 4 for an example. Training, prediction of labels, identifying pixels with highly uncertain labels, obtaining labels only for those pixels with highly uncertain labels and retraining are performed iteratively to finally provide the machine vision model. The iterative approach uses very few labelled pixels to obtain the final machine vision model. The machine vision model accurately labels areas of a data image.

Embodiments reduce the burden of annotation in semantic segmentation tasks from two perspectives: 1) models are developed with lower level of data dependency such as weakly-supervised, semi-supervised and self-supervised, and 2) AL (or human in the loop (HIL)) is only used to label the most informative subset of data.

To reduce the cost of labeling, various types of modeling approaches exist: weakly supervised, semi-supervised and self-supervised models. Weakly supervised models are based on efficient annotation schemes, such as scribbles, eye tracking, object pointing, web-queried samples, bounding boxes, extreme clicks for objects and image-level labels. Weakly-supervised approaches do not exploit unlabeled data to extract additional training signal also these models are passive meaning the labelling process is driven by the human annotator, rather than the model.

Semi-supervised learning uses both labeled and unlabeled data for model training. The main semi-supervised approaches are consistency training and pseudo labeling. Consistency training method has shown to be a powerful framework for leveraging unlabeled data.

Embodiments use semantic segmentation models trained in an AL framework and are able to achieve comparable results compared to weakly and semi-supervised learning with far fewer annotations (not as many pixels in the training image need to be labelled by a human). Embodiments reduce model data dependency by using a sparse pixel annotation scheme similar to a weak supervision concept embedded in an AL framework.

AL approaches include various subset selection strategies. In an uncertainty-based approach, an uncertainty measure is defined and samples with the largest uncertainty are selected for labeling. Some measures of uncertainty include entropy, margin sampling, and Bayesian-based measures such as Bayesian active learning by disagreement (BALD), Batch-BALD, Causal-BALD and PowerEvaluationBALD. BALD is defined as the mutual information between predictions and model posterior and scores samples based on how well their predicted labels inform us about the true model parameter.

Practical systems perform batch acquisition, that is, acquisition of multiple samples at a single query.

In a comparative example, batch acquisition is performed using BALD sampling to select the set from the top percentile points with the highest BALD value. This sampling approach often selects similar and redundant samples, performing worse than random selection in some cases. This is a technical problem.

It is possible to use a sampling strategy that selects the best representative batches not samples individually. Batch selection if conducted naively is an intractable problem because a number of potential subsets grows exponentially with the size of data.

To overcome the problem of diversification facing uncertainty sampling methods, other lines of work such as coreset and loss-gradient-based selection strategies exist. Coreset approaches select a subset of data utilizing a geometric-based similarity function defined between images. These approaches rely on a feature space that requires extra engineering and suffer from the curse of dimensionality (intractably large computations are required) if the feature dimension goes high.

Embodiments use an uncertainty-based method and include a model that is backbone independent and computationally cost effective. Embodiments resolve the shortcoming of uncertainty-based approaches and sample diverse set of data points by utilizing a BAP sampling strategy.

To reduce the annotation cost AL semantic segmentation models were developed that have various level of data selection granularity such as region-based or pixel-based approaches versus the image-based selection. Image-based approaches consider an entire image as a sample while region-based approaches divide images into non-overlapping patches and consider each patch as a sample. Further design choices for the region-based approach are the shape and size of the regions chosen for annotation methods such as irregular superpixels, rectangle plus polygon and rectangular boxes.

Superpixel algorithms divide an image into irregularly-shape regions by grouping similar pixels together, preserving natural object boundaries. As a result, most pixels within a superpixel are from the same class. This enables the use of a light-weight annotation scheme where each superpixel is annotated by only one class label that represents the majority of the pixels. This scheme reduces the annotation burden by not requiring polygon and intersection clicks which are required in box or polygon region-based annotations.

Pixel-based sparse annotation AL models can further decrease the annotation cost. Pixelpick active learning framework was recently introduced that queries only a fraction of pixels in each image at each cycle.

To select the most informative subset of data either in the form of regions or pixels various AL models have been developed. The main categories are uncertainty based, pseudo label based and deep reinforcement learning (RL). The best performing uncertainty sampling strategy used the predicted soft-max probabilities and selected samples with the largest difference between the first and the second predicted class probabilities. However, to select diverse subset the sampling was conducted from a randomly selected initial bigger subset.

One of the main challenges in semantic segmentation is the presence of imbalanced data since ubiquitous environment and background categories typically exist within each image.

Embodiments provide a PixelBABA framework with example logic 1-10 as shown in FIG. 1.

In FIG. 1, at operation 1-1, first labels for a first subset of pixels in a training image are obtained. This can be by human in the loop (HIL).

At operation 1-2, a segmentation model is trained using the first subset.

At operation 1-3, probability distributions for the remaining, unlabelled pixels of the training image are predicted. The probability distribution gives a probability (y axis of the probability distribution), for a given pixel, of the true label being a particular value (x axis of the probability distribution).

At operation 1-4, an acquisition function based on first mutual information (MJEnt, see Equation 1) and second mutual information BALD (mutual information between the model parameters and the predictive output) is used. The acquisition function identifies a second subset of the pixels of the training image. The predicted labels of the pixels of the second subset have high uncertainty.

At operation 1-5, second labels are obtained for the second subset. This can be by HIL.

At operation 1-6, the segmentation model is trained based on the second subset.

Figure 7:
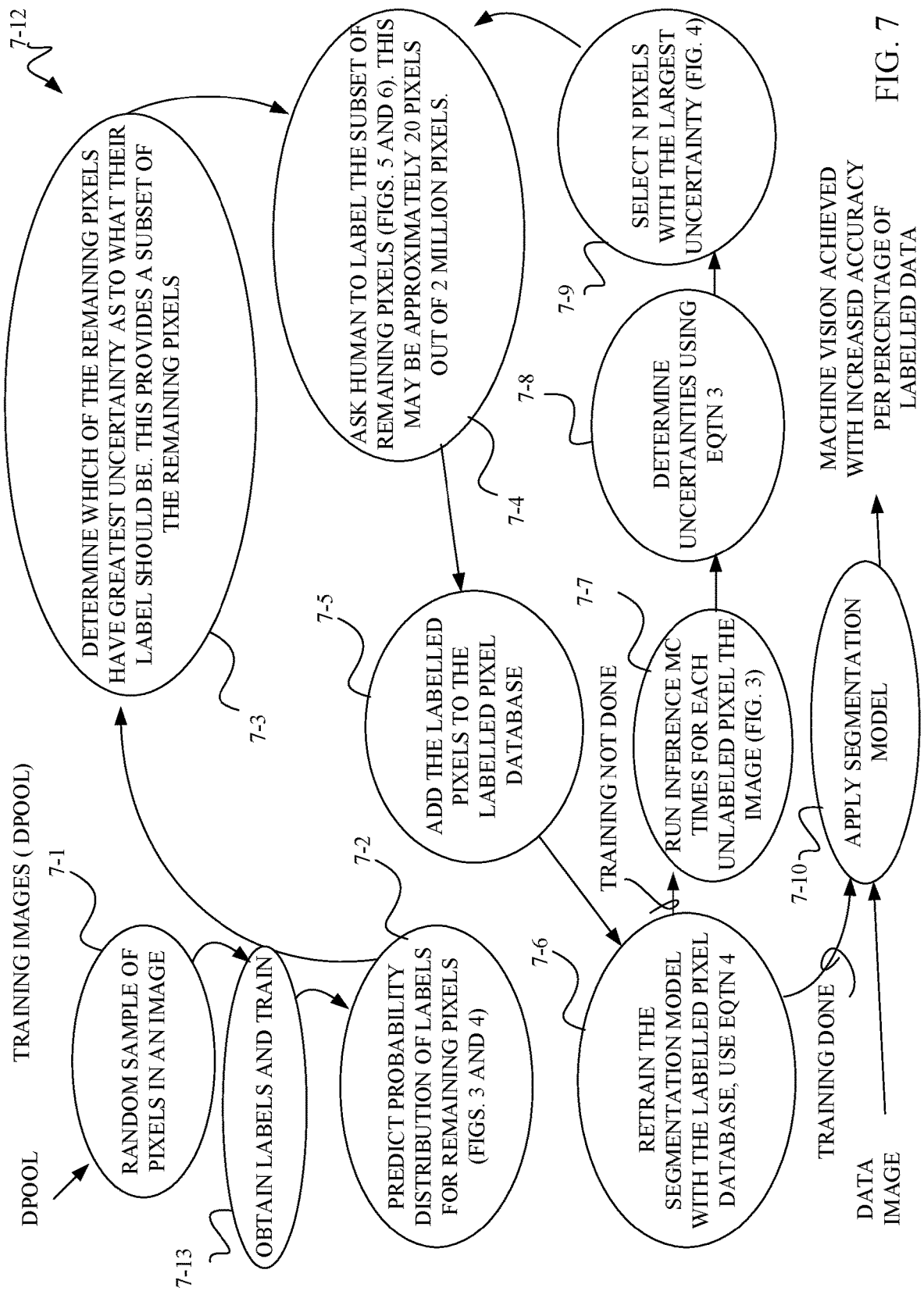
FIG. 7 illustrates an algorithm flow, according to some embodiments.

Operations 1-3, 1-4, 1-5 and 1-6 may be repeated until an iteration budget is exhausted (a predetermined number of computations have been performed). Repetition is not shown in FIG. 1. In FIG. 7, discussed below, repetition occurs in the cycle 7-7, 7-8, 7-97-4, 7-5, 7-6 until the iteration budget is exhausted.

Referring again to FIG. 1, at operation 1-7 a data image is used for analysis. Analysis means the computer recognizing different regions in the data image.

At operation 1-8, the trained segmentation model is applied to the data image to identify third labels for regions in the data image. Example performance of the trained segmentation model is provided in Tables 1 and 2, discussed below.

Thus, as shown in FIG. 1, a method of generating a machine vision model for recognition of scene content is provided. The generating includes obtaining a first plurality of labels for a first subset of pixels in a training image in which the first plurality of labels are drawn from a set of class labels (operation 1-1). The generating also includes training the segmentation model based on the first plurality of labels in which the segmentation model is the machine vision model (operation 1-2). The generating includes predicting a plurality of probability distributions for respective remaining pixels in the training image in which the remaining pixels do not have labels (operation 1-3). The generating includes identifying, with an acquisition function, a second subset of remaining pixels with a greatest level of uncertainty in which the acquisition function uses a first mutual information of MJEnt and a second mutual information measure of BALD (see operation 1-4). The generating also includes obtaining a second plurality of labels, from the set of class labels, for the second subset (operation 1-5), and training the segmentation model based on the second subset using the second plurality of labels (operation 1-6). After the machine vision model is generated, a data image may be received for analysis (operation 1-7) and machine vision may recognize regions in the data image using the segmentation model to identify a third plurality of labels (operation 1-8). The labels are from the set of class labels.

Figure 2:
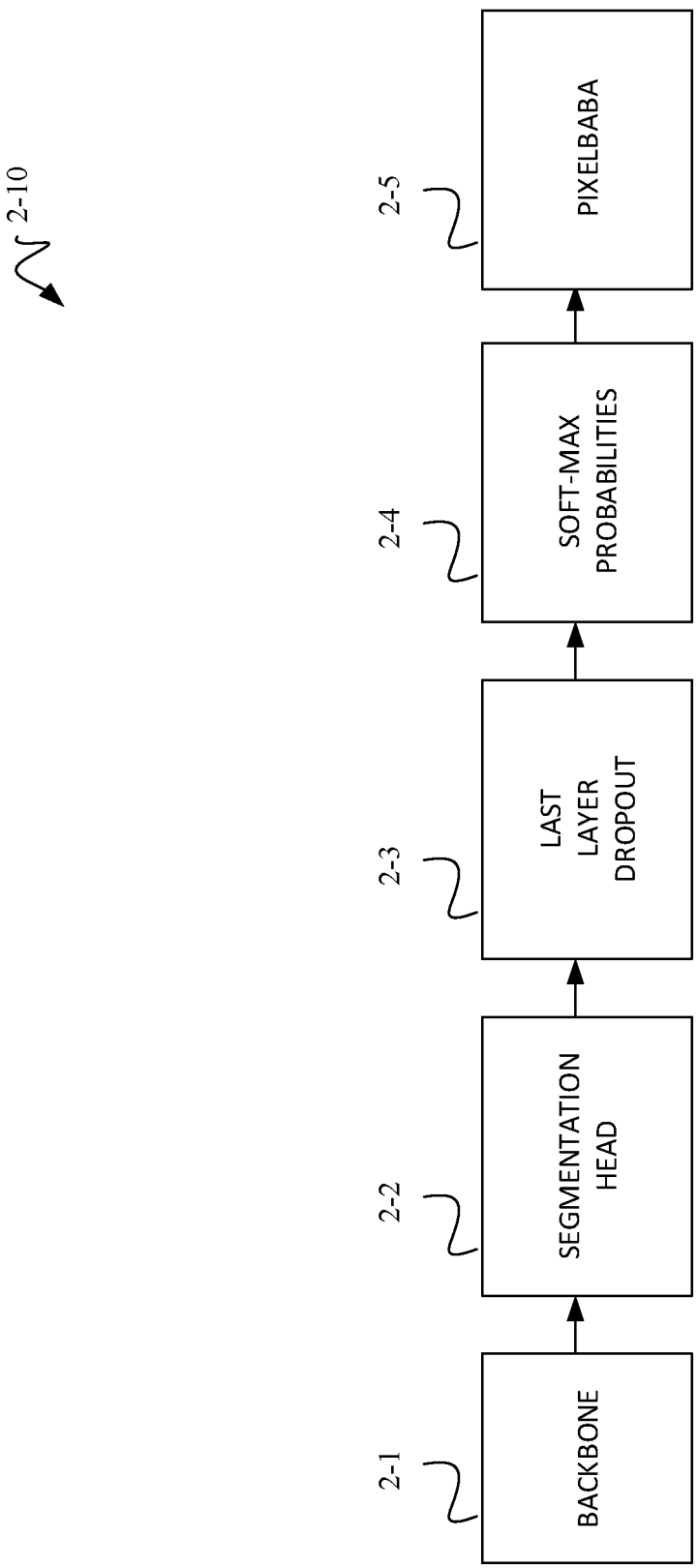
FIG. 2 illustrates a block diagram for the segmentation model, according to some embodiments.

The framework consists of four main components, a simple and backbone independent Bayesian deep learning model, pixel-based loss, BABA based acquisition function and click-base annotation tool. These components are illustrated in FIG. 2.

Quantifying a model's predictive uncertainty is important in deep learning applications. However, standard deep learning models do not capture model uncertainty. For example, in classification tasks, soft-max predictive outputs might have predicted the correct label but they do not represent the confidence in the predictions. To quantify neural networks uncertainty, a Bayesian deep learning model provides a mathematical framework to reason about model uncertainty. But Bayesian deep learning models usually have a high computational cost.

Dropout layers in a model architecture can reduce computational cost. A predictive outcome of deep learning models with embedded dropout layers can be interpreted as a Bayesian approximation. Thus, models' forward passes can be collected and used to estimate the predictive mean and predictive uncertainty. The forward passes can be done concurrently, resulting in constant running time identical to that of standard dropout.

Embodiments use the probabilistic interpretation of dropout in deep learning models. One embodiment, referred to as PixelBABA AL, uses a dropout-based Bayesian deep learning framework. PixelBABA Bayesian model generates distributions of predictive probabilities as the output and enables utilization of BAP, discussed below as Equation 3 (or other types of) uncertainty based acquisition functions.

Embodiments include a dropout-based Bayesian model in PixelBABA framework. Embodiments only add a last layer dropout to the backbone architecture instead of implementing dropout layers throughout the network backbone. Last layer dropout based Bayesian model is a simple and cost-effective architecture and it is effective for generating normal predictive probability distributions. Embodiments replace the last linear layer with a dropout layer and ReLU activated linear layer. Moreover to its simplicity and cost effectiveness this model architecture of embodiments enables seamless integration of various semantic segmentation backbones to the PixelBABA framework.

In PixelBABA using a Bayesian deep learning model, embodiments generate distributions for predictive outputs by Monte Carlo sampling of repeated models' forward pass. These distributions are not in a closed analytical form. Having a closed form for the predictive probabilities would enable utilization of various information-theory based concepts and further analysis to capture models' uncertainty. Embodiments approximate the output of soft-max layer of a dropout-based Bayesian deep learning with a Beta probability distribution.

Figure 3:
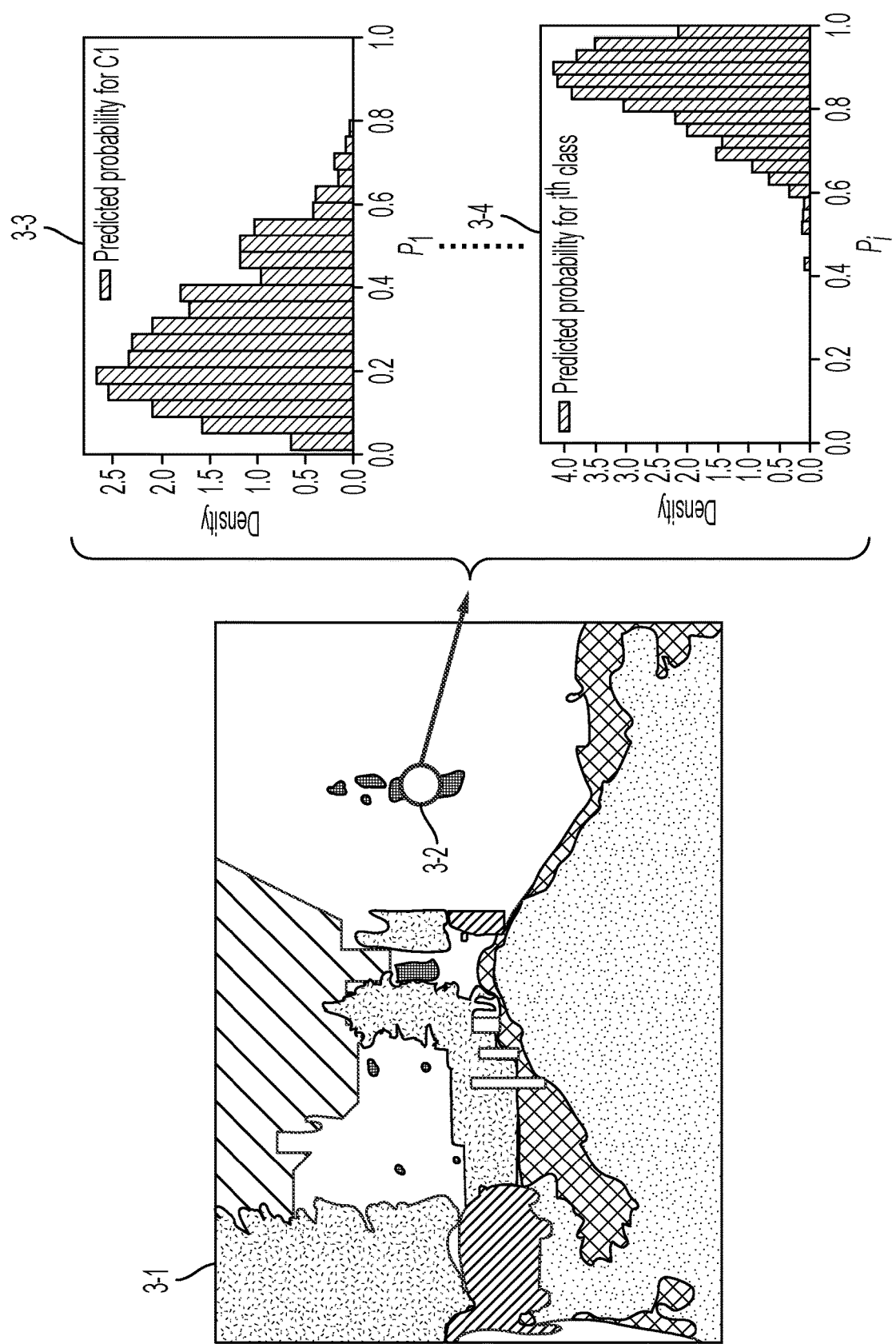
FIG. 3 illustrates determining probability distributions for unlabelled pixels of an image, according to some embodiments.

Beta distribution, Beta($\alpha$, $\beta$), is a continuous probability distributions defined on the interval [0, 1] with two positive shape parameters, $\alpha$ and $\beta$, controlling the shape of the distribution. Because Beta distribution is defined on the [0, 1] interval and can have various shape, it is good candidate to approximate the predictive probabilities. By calculating mean and variance of the probability distributions' histogram generated by the Bayesian model we can simply estimate $\alpha$ and $\beta$ and therefor fit a Beta distribution. A schematic of predictive probabilities histograms are shown in FIG. 2. Corresponding approximated Beta distributions are shown in FIG. 3.

FIG. 2 illustrates a Bayesian semantic segmentation model with last layer dropout with pixel-base loss and the inference output of the model, [W, H, $n_{class}$, $m_c$]. Per pixel probability distributions obtained from Monte Carlo forward pass with dropout are shown in histogram form in FIG. 3. The BABA acquisition function, per pixel probability distributions are approximated with a Beta distribution, shown in FIG. 4. Per-pixel BABA values are calculated, N pixels (here N=4) with the largest BABA values are selected, shown with dots in FIG. 4.

Figure 5:
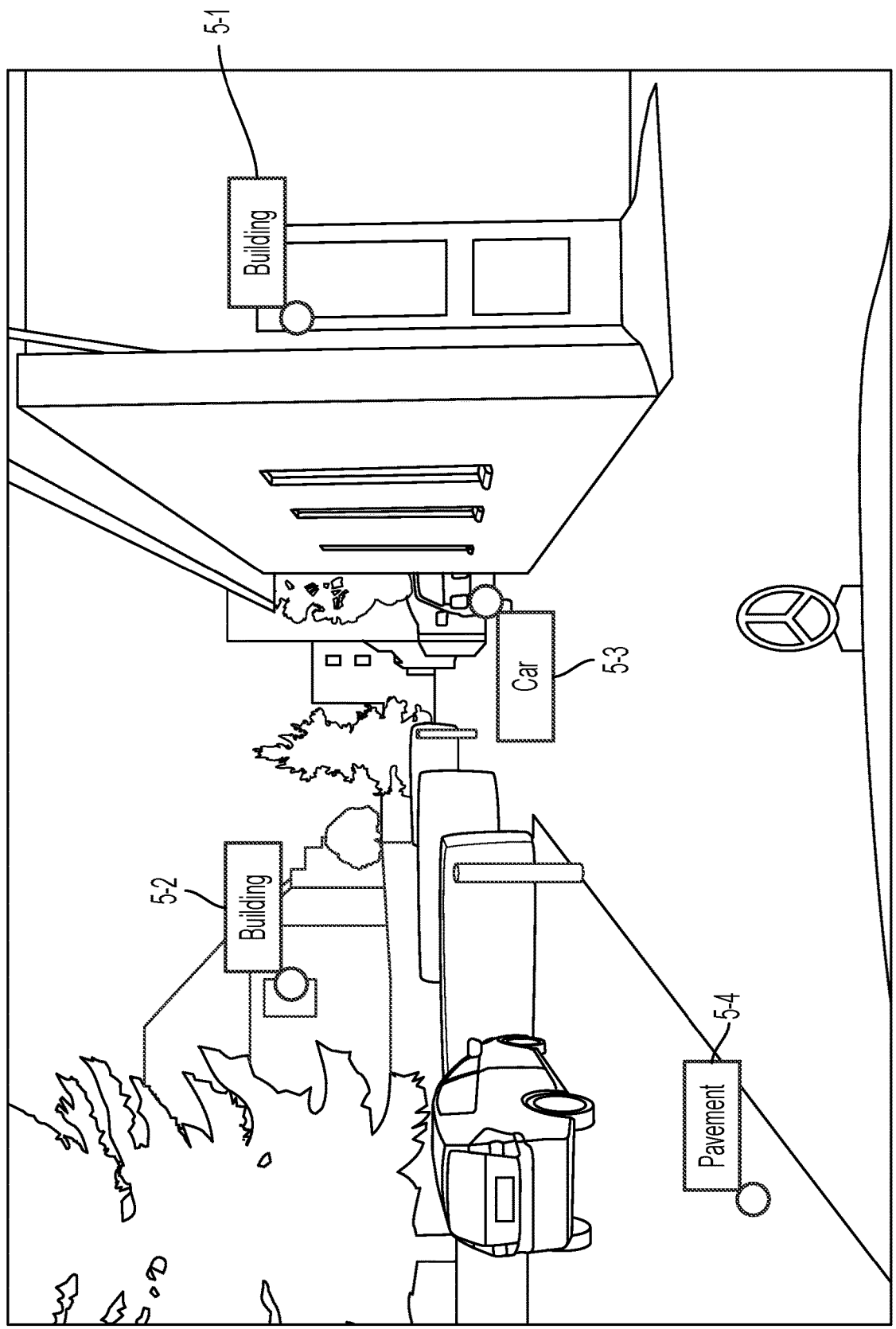
FIG. 5 illustrates a human labelling selected pixels identified as having high uncertainty regarding their labels, according to some embodiments.
Figure 6:
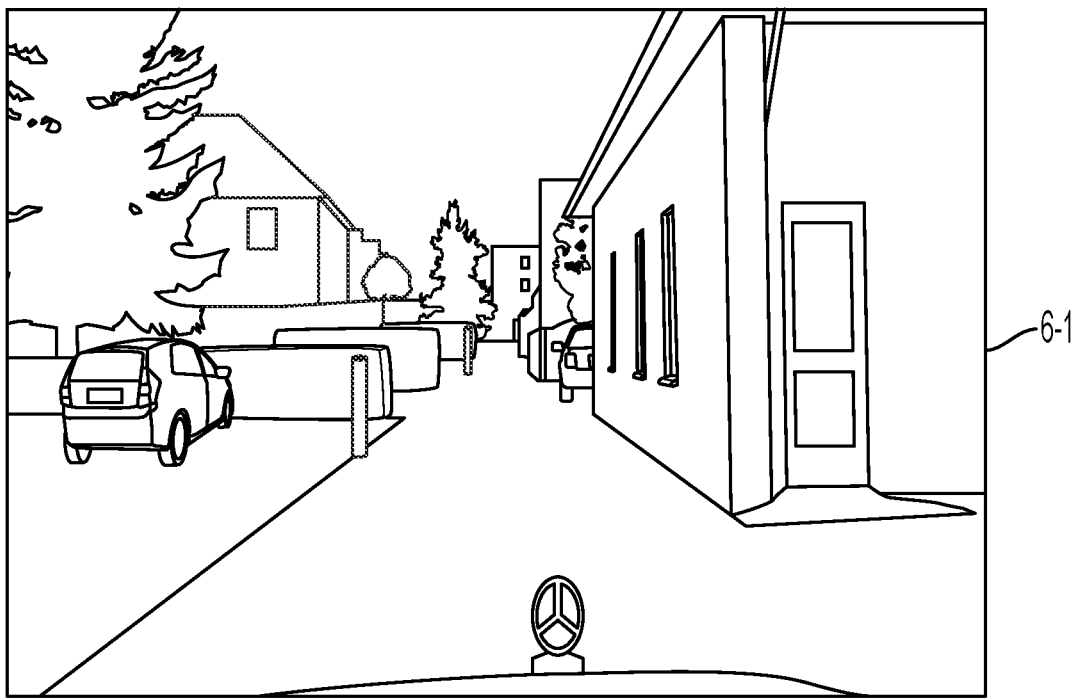
FIG. 6 illustrates an image and pixels of the image which have been labelled.
Figure 6:
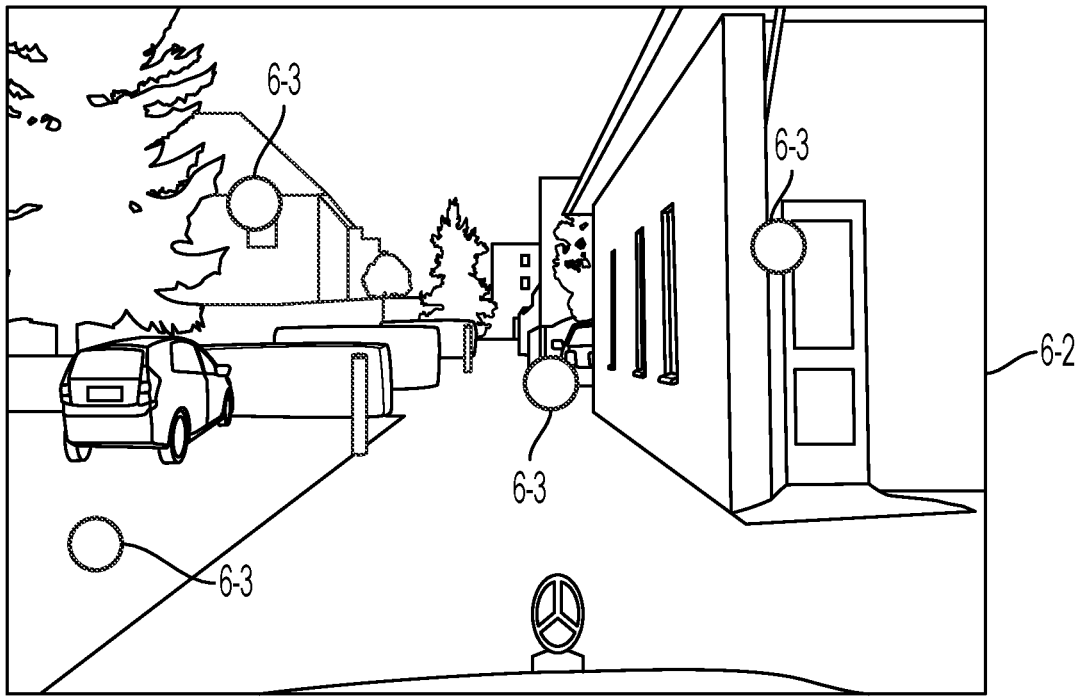

A graphic user interface of a click-base annotation tool is shown in FIG. 5.

We define marginalized joint entropy, MJEnt, defined in Equation 1 as an uncertainty measure that sums up three types of uncertainty faced in active learning model training process: epistemic, aleatoric and posterior uncertainties.

$$\text{MJEnt} = -\Sigma_i(EP_i)h(P_i^+) + H(y), \quad \text{Equation 1}$$

E is an expectation operator, $P_i^+$ is a conjugate Beta posterior distribution of $P_i$, $P_i$ is a value in the first probability distribution, H is the Shannon entropy, and h is a differential entropy.

The differential entropy h can be analytically calculated given that $P_i$ is approximated with Beta distribution. The first term, $\Sigma_i(EP_i)h(P_i^+)$, is called posterior uncertainty and captures the bias of a model toward predicting Pi for a given $x_i$ by calculating its expected posterior entropy.

H(y) can be decomposed into two uncertainty measures as shown in Equation 2: epistemic uncertainty (first term) and aleatoric uncertainty (second term).

$$H[y] = -I(y, \theta) + E_\theta[H(y|\theta)] \quad \text{Equation 2}$$

BAP uncertainty measure is defined as a ratio between marginalized joint entropy, MJEnt (a first mutual information) and second mutual information, BALD $$BAP = \frac{BALD}{MJEnt} \text{ if } MJEnt \geq 0, \quad \text{Equation 3}$$

and $$BAP = \frac{MJEnt}{BALD} \text{ if } MJEnt < 0,$$

BALD is a mutual information between parameters of the segmentation model and a predictive output at pixel x.

BAP, unlike other existing uncertainty measures such as BALD or Entropy that only measure either epistemic or aleatoric uncertainties provides a holistic uncertainty measure taking into account the mutual effect of various uncertainty sources in the AL model. Because of high sensitive of BAP to Beta distribution parameters this measure can capture small changes in the underlying probability distributions resulting to higher sampling diversification.

In PixelBABA AL model the last layer dropout Bayesian model generates a pixel-wise probability distribution that we approximate by Beta distributions as schematically shown in FIG. 1. Then we calculate per pixel BAP values and select pixels with largest BAP values for labeling. The BAP calculations is a stand alone measure without the need for further information from neighboring pixels. Hence pixel-wise BABA calculation can be run in parallel to reduce the computational cost.

PixelBABA AL model is based on sparse pixel annotation. Instead of feeding labels for whole image or regions within the image (such as superpixels, boxes or polygons) we only train the model with few labeled pixels per image. In semantic segmentation the classification is done per each pixel. To train the model with sparse pixel annotation we simply calculate the loss for the labeled pixels. Therefor any existing semantic segmentation deep learning model can be trained using sparse pixel annotation. We use a cross-entropy loss for labeled pixels in PixelBABA AL as defined in Equation 4.

$$L(\theta^k, D_L^k) = -\frac{1}{|D_L^k|} \sum_{x \in D_L^k} \sum_i^C y_i \cdot \log(EP_i) \quad \text{Equation 4}$$

where i, $D_L$, k, x, $EP_i$ and $y_i$ are the index over (1, ..., C) classes, labeled pixel data, AL cycle, pixel coordinates, model prediction for the $i^{th}$ class, and ground truth label for the $i^{th}$ class, respectively. Also, $\theta_k$ and $D_L^k$ are mean model parameters and labeled data, respectively, at cycle k.

PixelBABA AL model training is explained in Table 1. Pixel-BABA is an iterative process and to start the AL training we first randomly sample n pixels per image for labeling from a given unlabelled dataset, $D_{pool}$. Then the Bayesian semantic segmentation model will be trained with this labeled data. The unlabeled data are fed to the trained segmentation model to predict a pixel-wise class probability distributions. The model's pixel-wise prediction distributions are passed to the acquisition function to estimate per-pixel uncertainties and select n pixels with the largest uncertainty to be labelled.

At each cycle iteration, k, the queries are sent to annotators, and the resulting labels are added to the labelled pixel database, $D^k$. The segmentation model is retrained on the expanded database, the uncertainty scores of the remaining unlabeled dataset will be calculated and new sets of pixels will be selected for annotation. These steps are repeated until the annotation budget is exhausted. Here, we use the ground truth label to simulate such annotation process.

TABLE 1

Algorithm of PixelBABA

1  Inputs are as follows. N: number of pixels per image for query; $m_c$: number of dropout samples at inference, r: Dropout ratio, $K_{tot}$: active learning iteration budget k: iteration.
2  Initialize the model with pretrained backbone weights.
3  k := 0
4  $D_L^k$ := 0
5  Randomly sample n pixels per image to be label from $D_{pool}$.
6  While k < $K_{tot}$: do
7   Add newly label data to $D_L^k$
8   Train the model with $D_L^k$ and loss defined in Equation 4
9   Run inference $m_c$ times for $D_{pool}$ and save pixel probability distributions
10  Calculate BAP value for each pixel/image using Equation 3
11  Select n pixels per image with the largest BAP value in $D_{pool}$ for labeling.
12  k:=k+1

FIG. 7 illustrates an algorithm flow 7-12 corresponding to the algorithm of Table 1.

At 7-1, training images from a pool referred to as Dpool are provided. The algorithm flow discusses one training image, but generally, many training images are used. At 7-1, then pixels are randomly sampled in the training image. These pixels are labelled and the model is trained (7-13 in FIG. 7) or a backbone with pre-trained weights is used. This is part of a start-up phase. The labelled pixels are used to initialize a labelled pixel database.

At 7-2 probability distributions of labels are predicted. Also see FIGS. 3-4. At 7-3 pixels with the greatest label uncertainty are found, this may use Equation 3.

The iterative loop is now entered. At 7-4 a human labels the pixels with greatest uncertainty. See FIGS. 4 and 5.

At 7-5, the labelled pixels are added to the labelled pixel database.

At 7-6, the segmentation model is retrained using the loss of Equation 4. If the iteration budget is exhausted, the iteration ends and the segmentation model is applied to a data image at 7-10 to perform machine vision with increased accuracy as a percentage of labelled data. See Tables 2 and 3.

If the training is not completed, the algorithm flow proceeds from 7-6 to 7-7 and inference is performed MC times for remaining pixels in the image (see FIG. 3). Uncertainties are determined using Equation 3 at 7-8 and pixels are selected with the largest uncertainty, see FIG. 4. The iteration continues with 7-4, which has been discussed above.

Overall, 7-1 includes sampling N pixels of the training image as the first subset, wherein the sampling is performed randomly and the first set includes N randomly-sampled pixels. 7-13 includes obtaining N labels for the N randomly-sampled pixels, initializing a labelled pixel database with the first plurality of labels and training. 7-2 includes predicting probabilities. 7-3 includes applying the acquisition function to the plurality of probability distributions to select N pixels of the plurality of unlabeled pixels in which the N pixels are associated with a largest uncertainty, and obtaining the second subset as N pixels with the largest uncertainty. 7-5 includes supplementing the labelled pixel database with the second plurality of labels 7-6 includes performing second training of the segmentation model using the labelled pixel database. Taking the algorithm path from 7-6 to 7-7 (training not done) repeating a predetermined number of times indicating an active learning iteration budget: the predicting including 7-7, the applying (7-8 and 7-9), the obtaining the second plurality of labels (7-4), the supplementing (7-5) and the performing the second training (7-6); and outputting, after a completion of the repeating, the segmentation model as the machine vision model for recognition of scene content (transition to 7-10).

Figure 4:
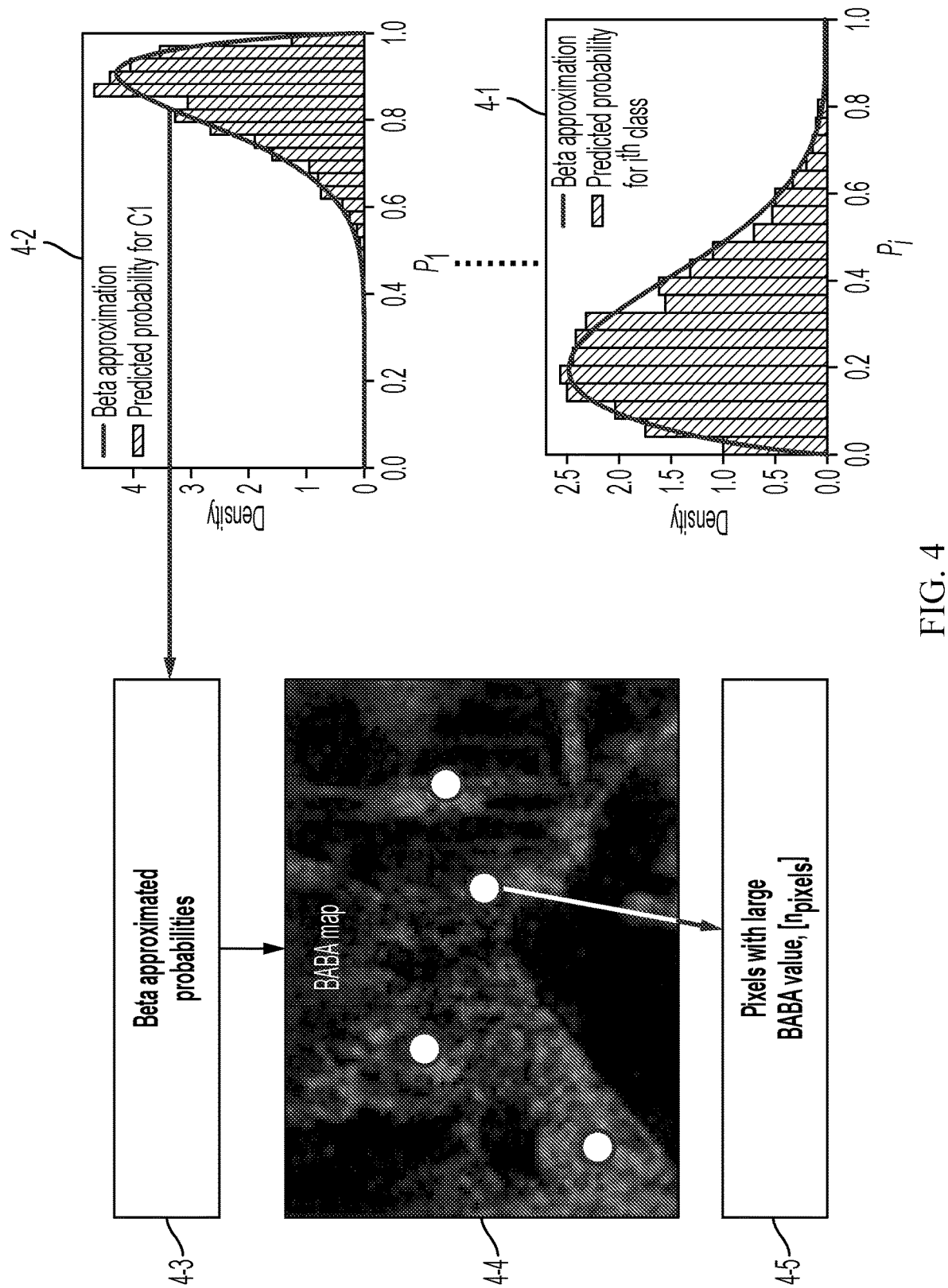
FIG. 4 illustrates determining pixels associated with predicted labels with high uncertainty, according to some embodiments.

Continuing to discuss example embodiments, overall, in some embodiments, the segmentation model includes a backbone stage (2-1 of FIG. 2), a segmentation stage (2-2 of FIG. 2), a last layer dropout stage (2-3 of FIG. 2), a probabilities stage (2-4 of FIG. 2) and a mutual information stage (2-5 of FIG. 2). Predicting the plurality of probability distributions by embodiments includes performing inference, using the segmentation model and for a first pixel of the plurality of unlabeled pixels, M times to form a histogram over the set of class labels (see FIG. 3). Embodiments also include normalizing the histogram by M for the first pixel to obtain a first probability distribution for the first pixel (FIG. 4).

In example embodiments, the plurality of probability distributions includes a first probability distribution, and the first probability distribution depends on a first parameter W and a second parameter H, the first parameter W is a posterior uncertainty and the second parameter H is a Shannon entropy, see Equation 1. The applying the acquisition function includes determining a ratio between the second mutual information (BALD) and the first mutual information (MJEnt), wherein MJEnt is a marginalized joint entropy (MJEnt), wherein the ratio is a Bayesian active learning (BAP) ratio, See Equation 3. In some embodiments, the BAP ratio for a given pixel location x, BAP, is given by Equation 3. In Equation 3, BALD is a mutual information between parameters of the segmentation model and a predictive output at pixel x.

In some embodiments, MJEnt(x) is given by Equation 1. In Equation 1, E is an expectation operator, $P_i^+$ is a conjugate Beta posterior distribution of $P_i$, $P_i$ is a value in the first probability distribution, H is the Shannon entropy, and h is a differential entropy.

Considering the size of images processed from the datasets and using N=20, as one example, the training image includes P pixels and a ratio of N to P is on an order of 1:10,000.

As an example, two datasets are considered: CAMVID and CityScape. CAMVID is an urban scene segmentation dataset composed of 11 categories and containing 367, 101, and 233 images of 360×480 resolution for training, validation, and testing, respectively.

CityScape includes high-resolution images (1024×2048) with 19 classes and collected for autonomous driving. It consists of 2975 and 500 training and validation images respectively. For speeding up the training, the training dataset are resized to 256×512 pixels while the inference is conducted at original resolution of 512×1024.

As example architectures, embodiments include using MobileNetv2 implemented in DeepLabv3+ and, as a second architecture, Feature Pyramid Network (FPN) with a dilated version of ResNet, that replaces the stride of the last two residual blocks with atrous convolutions.

Embodiments enforce the cross-entropy loss only on the labelled pixels and use Adam optimization for CamVid and Cityscapes datasets and SGD with momentum 0.9 and a learning rate of 0.01 for VOC2012 and train the model for 50 epochs. Embodiments implement a learning rate decay and learning rate scheduling as proposed by Pixelpick.

Embodiments apply random scaling between [0.5, 2.0], random horizontal flipping, color jittering and Gaussian blurring.

Embodiments include input parameters of: (1) $m_c$: repeats of forward pass to generate model prediction distributions, (2) r dropout ratio, and (3) N: pixel labelling budget per cycle.

Tables 2-3 provide the mean intersection over union (mIoU) with 5 repeats with different random seeds for all experiments.

In pixelBABA AL model we have three main input parameters: N pixel. Monte Carlo sampling (or repeats of the model's forward pass) $m_c$ and dropout ratio, r. As an example, the dropout ratio is 20%.

Experiments indicate that $m_c$ with a value of 20 provides good accuracy.

The other important setting is number of pixels that are being selected for labeling. PixelBABA AL model accuracy is mostly related to the amount of labeled data not the intervals at which the model is fed with the data. Thus, there is no constraint in selecting N. It is a choice between the amount of cycles needed for training and the amount of labeling per cycle.

TABLE 2

| MIoU for (supervised, PixelBABA, BALD and random) vs. Cycle | | | | |
|---|---|---|---|---|
| | Training Algorithm | | | |
| Cycle | Supervised | PixelBABA | BALD | random |
| 1 | 0.64 | 0.55 | 0.55 | 0.55 |
| 5 | 0.64 | 0.63 | 0.61 | 0.61 |
| 10 | 0.64 | 0.64 | 0.62 | 0.62 |

TABLE 3

| MIoU for (PixelBABA, BALD and random) vs. Percent Labelled Data | | | | |
|---|---|---|---|---|
| Percent Labelled Data | Training Algorithm | | | |
| | Supervised | PixelBABA | BALD | random |
| 2 | N/A | 0.59 | 0.57 | 0.56 |
| 5 | N/A | 0.62 | 0.59 | 0.59 |
| 10 | N/A | 0.63 | 0.61 | 0.61 |

Embodiments, including PixelBABA, are an active learning method for semantic segmentation that uses BAP uncertainty measure (Equation 3) embedded in a Bayesian Deep Learning framework. Embodiments use pixel selection as a data-efficient active learning strategy. Embodiments acquire labels for only the most promising pixels of the images and at the same time reduce the labeling effort. Embodiments are agnostic to data format and model backbone, and are applicable to a wide range of scenarios.

Table 3 shows the effectiveness of PixelBABA with respect to the percentage of labeled pixels, and demonstrates its advantage over the traditional approach on both CAMVID and Cityscapes datasets. PixelBABA has embedded diversification and exploration properties that result in performance on par as supervised training with less than 1% of labels even for imbalanced classes, without the need to develop a weighted based loss or change of the model architecture.

PixelBABA presents a new and holistic uncertainty measure for the semantic segmentation AL. Active learning applications reducing either the model uncertainty (epistemic) or data uncertainty (aleatoric) does not guarantee a well-trained model. PixelBABA's superior performance is due to use of model and data uncertainties concurrently through AL model training.

Figure 8:
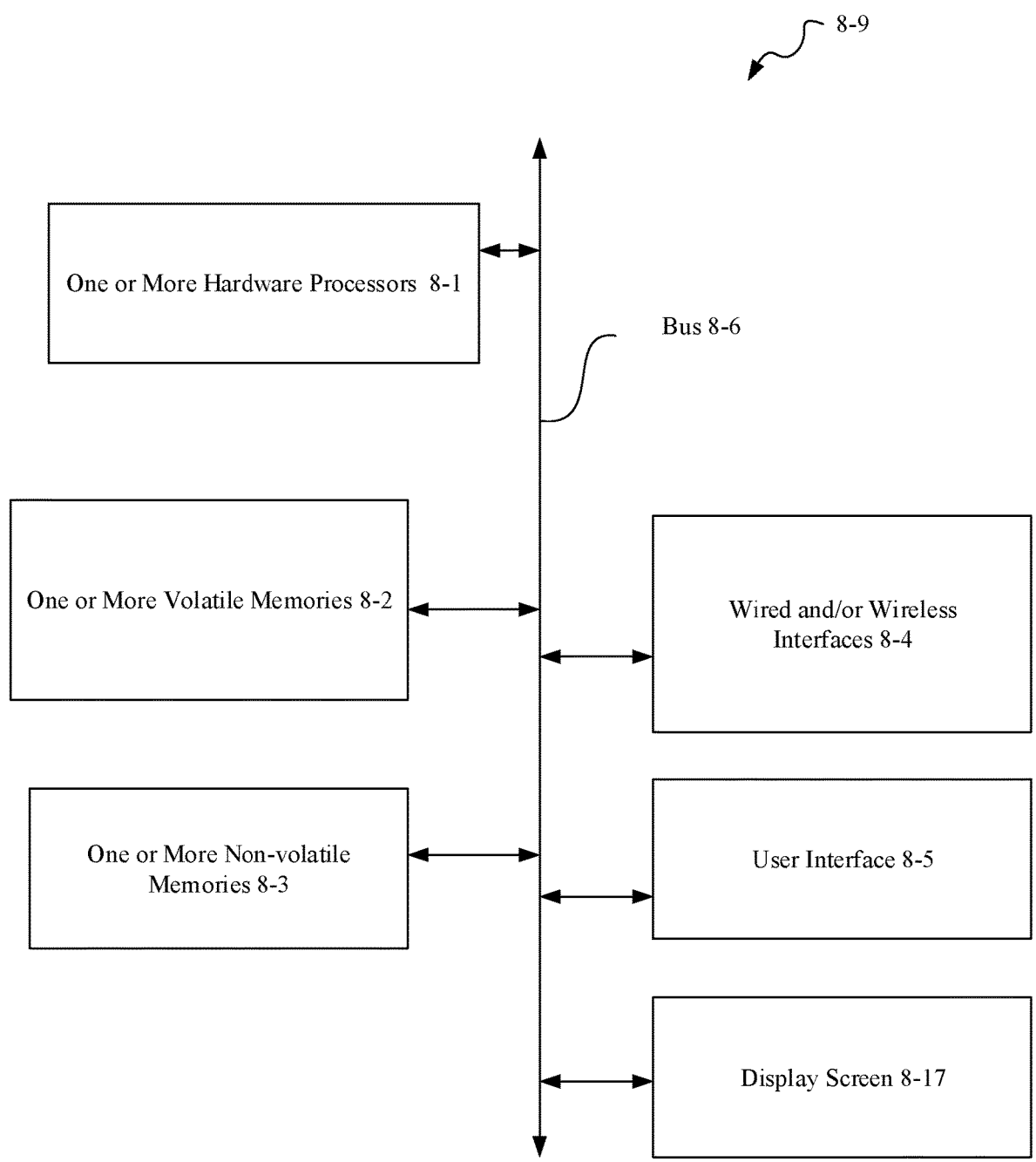
FIG. 8 illustrates exemplary hardware for implementation of computing devices for implementing the systems and algorithms described by the figures, according to some embodiments.

FIG. 8 illustrates exemplary hardware for implementation of computing devices for implementing the systems and algorithms described by the figures, according to some embodiments.

Hardware for performing embodiments provided herein is now described with respect to FIG. 8. FIG. 8 illustrates an exemplary apparatus 8-1 for implementation of the embodiments disclosed herein. The apparatus 8-1 may be a server, a computer, a laptop computer, a handheld device, or a tablet computer device, for example. Apparatus 8-1 may include one or more hardware processors 8-9. The one or more hardware processors 8-9 may include an ASIC (application specific integrated circuit), CPU (for example CISC or RISC device), and/or custom hardware. Apparatus 8-1 also may include a user interface 8-5 (for example a display screen and/or keyboard and/or pointing device such as a mouse). Apparatus 8-1 may include one or more volatile memories 8-2 and one or more non-volatile memories 8-3. The one or more non-volatile memories 8-3 may include a non-transitory computer readable medium storing instructions for execution by the one or more hardware processors 8-9 to cause apparatus 8-1 to perform any of the methods of embodiments disclosed herein.

What is claimed is:
1. A method of training a machine vision model for recognition of scene content, the method comprising:
obtaining a first plurality of labels for a first subset of pixels in a training image, wherein the first plurality of labels are drawn from a set of class labels;

training a segmentation model based on the first plurality of labels, wherein the segmentation model is the machine vision model;

predicting a plurality of probability distributions for respective remaining pixels in the training image, wherein the remaining pixels do not have labels;

identifying, with an acquisition function, a second subset of remaining pixels with a greatest level of uncertainty, wherein the acquisition function uses a first mutual information of MJEnt and a second mutual information measure of BALD;

obtaining a second plurality of labels, from the set of class labels, for the second subset;

training the segmentation model based on the second subset using the second plurality of labels;

receiving a data image for analysis; and performing machine vision on the data image using the segmentation model to identify a third plurality of labels, from the set of class labels, corresponding to respective regions in the data image.

2. The method of claim 1, further comprising sampling N pixels of the training image as the first subset, wherein the sampling is performed randomly and the first subset comprises N randomly-sampled pixels.

3. The method of claim 2, wherein the obtaining the first plurality of labels comprises obtaining N labels for the N randomly-sampled pixels, wherein the remaining pixels are a plurality of unlabeled pixels;

wherein the method further comprises initializing a labelled pixel database with the first plurality of labels;

wherein the identifying comprises applying the acquisition function to the plurality of probability distributions to select N pixels of the plurality of unlabeled pixels, wherein the N pixels are associated with a largest uncertainty, thereby obtaining the second subset as N pixels with the largest uncertainty;

wherein the obtaining the second plurality of labels comprises obtaining the second plurality of labels for the N pixels with the largest uncertainty;

wherein the method further comprises supplementing the labelled pixel database with the second plurality of labels;

wherein the training the segmentation model based on the second subset comprises performing second training of the segmentation model using the labelled pixel database.

4. The method of claim 3, wherein the method further comprises repeating a predetermined number of times indicating an active learning iteration budget: the predicting, the applying, the obtaining the second plurality of labels, the supplementing and the performing the second training; and outputting, after a completion of the repeating, the segmentation model as the machine vision model for recognition of scene content.

5. The method of claim 4, wherein the segmentation model comprises a backbone stage, a segmentation stage, a last layer dropout stage, a probabilities stage and a mutual information stage, wherein the predicting the plurality of probability distributions comprises performing inference, using the segmentation model and for a first pixel of the plurality of unlabeled pixels, M times to form a histogram over the set of class labels.

6. The method of claim 5, further comprising normalizing the histogram by M for the first pixel to obtain a first probability distribution for the first pixel, wherein the plurality of probability distributions comprises the first probability distribution, the first probability distribution depends on a first parameter W and a second parameter H, the first parameter W is a posterior uncertainty and the second parameter H is a Shannon entropy.

7. The method of claim 6, wherein the applying the acquisition function comprises determining a ratio between the second mutual information (BALD) and the first mutual information (MJEnt), wherein MJEnt is a marginalized joint entropy (MJEnt), wherein the ratio is a Bayesian active learning (BAP) ratio.

8. The method of claim 7, wherein the BAP ratio for a given pixel location x, BAP, is given by a following expression:

$$BAP = \frac{BALD}{MJEnt} \text{ if } MJEnt \geq 0,$$

and $$BAP = \frac{MJEnt}{BALD} \text{ if } MJEnt < 0,$$

wherein BALD is a mutual information between parameters of the segmentation model and a predictive output at pixel x.

9. The method of claim 7, wherein MJEnt(x) is given by a following expression:

$$MJEnt = -\sum_i (EP_i)h(P_i^+) + H(y),$$

wherein E is an expectation operator, $P_i^+$ is a conjugate Beta posterior distribution of $P_i$, $P_i$ is a value in the first probability distribution, H is the Shannon entropy, and h is a differential entropy.

10. The method of claim 1, wherein the training image comprises P pixels and a ratio of N to P is on an order of 1:10,000.

11. An apparatus comprising:

one or more processors; and one or more memories storing instructions, wherein an execution by the one or more processors of the instructions is configured to cause the apparatus to:

obtain a first plurality of labels for a first subset of pixels in a training image, wherein the first plurality of labels are drawn from a set of class labels;

train a segmentation model based on the first plurality of labels, wherein the segmentation model is a machine vision model;

predict a plurality of probability distributions for respective remaining pixels in the training image, wherein the remaining pixels do not have labels;

identify, with an acquisition function, a second subset of remaining pixels with a greatest level of uncertainty, wherein the acquisition function uses a first mutual information of MJEnt and a second mutual information measure of BALD;

obtain a second plurality of labels, from the set of class labels, for the second subset;

train the segmentation model based on the second subset using the second plurality of labels;

receive a data image for analysis; and perform machine vision on the data image using the segmentation model to identify a third plurality of labels, from the set of class labels, corresponding to respective regions in the data image.

12. The apparatus of claim 11, wherein the one or more processors are further configured to sample N pixels of the training image as the first subset by sampling randomly, wherein the first set comprises N randomly-sampled pixels.

13. The apparatus of claim 12, wherein the one or more processors are further configured to the obtain the first plurality of labels by obtaining N labels for the N randomly-sampled pixels, wherein the remaining pixels are a plurality of unlabeled pixels;
   wherein the one or more processors are further configured to initialize a labelled pixel database with the first plurality of labels;
   wherein the one or more processors are further configured to identify by applying the acquisition function to the plurality of probability distributions to select N pixels of the plurality of unlabeled pixels, wherein the N pixels are associated with a largest uncertainty, thereby obtaining the second subset as N pixels with the largest uncertainty;
   wherein the one or more processors are further configured to the obtain the second plurality of labels by obtaining the second plurality of labels for the N pixels with the largest uncertainty;
   wherein the one or more processors are further configured to supplement the labelled pixel database with the second plurality of labels;
   wherein the one or more processors are further configured to train the segmentation model based on the second subset by performing second training of the segmentation model using the labelled pixel database.

14. The apparatus of claim 11, wherein the training image comprises P pixels and a ratio of N to P is on an order of 1:10,000.

15. The apparatus of claim 13, wherein the segmentation model comprises a backbone stage, a segmentation stage, a last layer dropout stage, a probabilities stage and a mutual information stage, wherein the one or more processors are further configured to predict the plurality of probability distributions by performing inference, using the segmentation model and for a first pixel of the plurality of unlabeled pixels, M times to form a histogram over the set of class labels.

16. The apparatus of claim 15, wherein the one or more processors are further configured to normalize the histogram by M for the first pixel to obtain a first probability distribution for the first pixel, wherein the plurality of probability distributions comprises the first probability distribution, the first probability distribution depends on a first parameter W and a second parameter H, the first parameter W is a posterior uncertainty and the second parameter H is a Shannon entropy.

17. The apparatus of claim 16, wherein the one or more processors are further configured to the apply the acquisition function by determining a ratio between the second mutual information (BALD) and the first mutual information (MJEnt), wherein MJEnt is a marginalized joint entropy (MJEnt), wherein the ratio is a Bayesian active learning (BAP) ratio.

18. The apparatus of claim 17, wherein the BAP ratio for a given pixel location x, BAP, is given by a following expression:

$$BAP = \frac{BALD}{MJEnt} \text{ if } MJEnt \geq 0,$$

and $$BAP = \frac{MJEnt}{BALD} \text{ if } MJEnt < 0,$$

wherein BALD is a mutual information between parameters of the segmentation model and a predictive output at pixel x.

19. The apparatus of claim 17, wherein MJEnt is given by a following expression:

$$MJEnt = -\sum_i (EP_i)h(P_i^+) + H(y),$$

wherein E is an expectation operator, $P_i^+$ is a conjugate Beta posterior distribution of $P_i$, $P_i$ is a value in the first probability distribution, H is the Shannon entropy, and h is a differential entropy.

20. A non-transitory computer readable medium storing instructions to be executed by one or more processors to:
   obtain a first plurality of labels for a first subset of pixels in a training image, wherein the first plurality of labels are drawn from a set of class labels;
   train a segmentation model based on the first plurality of labels, wherein the segmentation model is a machine vision model;
   predict a plurality of probability distributions for respective remaining pixels in the training image, wherein the remaining pixels do not have labels;
   identify, with an acquisition function, a second subset of remaining pixels with a greatest level of uncertainty, wherein the acquisition function uses a first mutual information of MJEnt and a second mutual information measure of BALD;
   obtain a second plurality of labels, from the set of class labels, for the second subset;
   train the segmentation model based on the second subset using the second plurality of labels;
   receive a data image for analysis; and
   perform machine vision on the data image using the segmentation model to identify a third plurality of labels, from the set of class labels, corresponding to respective regions in the data image.

* * * * *